(12) United States Patent
Oblinger et al.

(10) Patent No.: US 11,339,748 B2
(45) Date of Patent: May 24, 2022

(54) DEVICE FOR DRIVING EXHAUST GAS, IN PARTICULAR IN A RECIRCULATION LINE

(71) Applicant: FAURECIA SYSTEMES D'ECHAPPEMENT, Nanterre (FR)

(72) Inventors: Benjamin Oblinger, Lyoffans (FR);
Thierry Marimbordes, Essert (FR);
Jonathan Canteloube, Belfort (FR);
Mamadou Diouf, Bessoncourt (FR);
Ronan Botella, Chevremont (FR);
Dorian Hernandez, Joncherey (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/104,072

(22) Filed: Nov. 25, 2020

(65) Prior Publication Data
US 2021/0164422 A1    Jun. 3, 2021

(30) Foreign Application Priority Data

Nov. 28, 2019  (FR) ...................... 19 13390

(51) Int. Cl.
*F02M 26/47* (2016.01)
*F02M 26/05* (2016.01)
*F02M 26/34* (2016.01)

(52) U.S. Cl.
CPC ............ *F02M 26/47* (2016.02); *F02M 26/05* (2016.02); *F02M 26/34* (2016.02)

(58) Field of Classification Search
CPC ......... F02M 26/47; F01N 13/008; G01F 1/66; G01F 1/662
See application file for complete search history.

(56) References Cited

U.S. PATENT DOCUMENTS

| 2005/0066744 A1* | 3/2005 | Kupnik ................... | G01F 1/668 73/861.03 |
| 2006/0156827 A1* | 7/2006 | Lang ....................... | G01F 1/662 73/861.25 |
| 2006/0156828 A1* | 7/2006 | Konzelmann ............ | G01F 5/00 73/861.25 |

(Continued)

FOREIGN PATENT DOCUMENTS

| AT | 6511 U2 | 11/2003 |
| DE | 102004060065 A1 | 6/2006 |

(Continued)

OTHER PUBLICATIONS

French Written Opinion on the Patentability of the Invention dated Nov. 28, 2019 for French Patent Application No. 1913390.

(Continued)

*Primary Examiner* — Ngoc T Nguyen
(74) *Attorney, Agent, or Firm* — Carlson, Gaskey & Olds, P.C.

(57) ABSTRACT

A driving device includes a tubular circulation pipe of the exhaust gas, and at least two flow rate measuring members arranged to measure an exhaust gas flow rate circulating in the tubular circulation pipe. The driving device includes at least one monobloc support, housed in the tubular circulation pipe, and bearing at least two flow rate measuring members among said at least two flow rate measuring members.

11 Claims, 5 Drawing Sheets

(56) References Cited

U.S. PATENT DOCUMENTS

| | | | |
|---|---|---|---|
| 2008/0178853 A1* | 7/2008 | Yamaoka | F02M 26/49 123/568.11 |
| 2017/0122916 A1* | 5/2017 | Leaders | G01N 29/26 |
| 2021/0072052 A1* | 3/2021 | Molinazzi | G01F 1/363 |
| 2021/0172404 A1* | 6/2021 | Oblinger | F02M 35/10249 |
| 2021/0270650 A1* | 9/2021 | Takahashi | G01F 1/662 |

FOREIGN PATENT DOCUMENTS

| | | |
|---|---|---|
| EP | 2806254 A1 | 11/2014 |
| FR | 2909726 A1 | 6/2008 |
| JP | 2014215060 A * | 11/2014 |

OTHER PUBLICATIONS

French Preliminary Research Report dated Jun. 10, 2020 for French Patent Application No. 1913390.

* cited by examiner

DEVICE FOR DRIVING EXHAUST GAS, IN PARTICULAR IN A RECIRCULATION LINE

CROSS-REFERENCE TO RELATED APPLICATIONS

This application is a U.S. non-provisional application claiming the benefit of French Application No. 19 13390, filed on Nov. 28, 2019, which is incorporated herein by reference in its entirety.

TECHNICAL FIELD

The present disclosure relates to a device for driving exhaust gas, of the type including flow rate measuring members.

BACKGROUND

Such a driving device generally equips an exhaust gas recirculation line. An exhaust gas recirculation line is intended to redirect part of the exhaust gases of a combustion engine toward an intake manifold of this engine, in order to reduce the emissions of nitrogen oxides NOx for diesel engines and the $CO_2$ emissions for gasoline engines.

The quantity of exhaust gas redirected in the recirculation line is regulated by a valve, and the exhaust gas flow rate in the recirculation line is measured by flow rate measuring members equipping the driving device.

SUMMARY

The disclosure improves the precision of the flow rate measurement in such a driving device.

To that end, the disclosure provides a device for driving exhaust gas, which includes a tubular circulation pipe of the exhaust gas, and at least two flow rate measuring members arranged to measure an exhaust gas flow rate circulating in the tubular circulation pipe, and wherein the device includes at least one monobloc support, housed in the tubular circulation pipe, and bearing at least two flow rate measuring members among said at least two flow rate measuring members.

The inventors have observed that the flow rate measuring members are sensitive to vibrations, which reduce the precision of their measurements. The monobloc support makes it possible to dampen these vibrations.

As an example, the flow rate measuring members include an ultrasonic transmitter and an ultrasonic receiver, arranged facing one another, on either side of the tubular pipe. Thus, the exhaust gases circulate between this transmitter and this receiver.

The transmitter emits ultrasounds, which are received by the receiver. The duration between the transmission and the reception depends on the flow of exhaust gas circulating between the transmitter and the receiver. It is thus possible to determine the flow of exhaust gas as a function of this measured duration, in a manner known in itself.

The support makes it possible to mechanically insulate the measuring members from the pipe, in order to prevent part of the transmitted ultrasounds from being transmitted to the receiver through the material forming the pipe rather than through the exhaust gas, which would distort the measurement.

Thus, the support makes it possible to mechanically separate the transmitter and the receiver, so as to prevent the unwanted transmission of ultrasounds through the material of the pipe.

A driving device according to the disclosure may further include one or more of the following features, considered alone or according to any technically possible combinations:

Each monobloc support is overmolded on the tubular circulation pipe.

Each monobloc support is made from elastomer.

The flow rate measuring members include at least one ultrasonic transmitter and at least one ultrasonic receiver associated with the ultrasonic transmitter.

The driving device includes a single monobloc support bearing all of the flow rate measuring members.

The pipe is in two parts, these two parts being connected to one another by the monobloc support, without direct contact between these two parts.

The driving device includes two monobloc supports each bearing two respective measuring members.

The tubular circulation pipe bears two branches forming sleeves for housing flow rate measuring members, each flow rate measuring member being housed in a respective one of the sleeves, the monobloc support including, for each measuring member that it bears, a part bearing this measuring member while extending in the corresponding sleeve.

The tubular circulation pipe includes lateral openings, each flow rate measuring member being housed through a respective one of these lateral openings, the monobloc support including, for each measuring member that it bears, a part bearing this measuring member while extending through the corresponding lateral opening.

The tubular circulation pipe is made from plastic.

The disclosure also relates to an exhaust gas recirculation line, that includes a driving device as previously defined.

The disclosure also relates to a vehicle, that includes an exhaust gas recirculation line as defined above.

BRIEF DESCRIPTION OF THE DRAWINGS

Various aspects and advantages of the disclosure will the highlighted in the following description, provided solely as a non-limiting example and done in reference to the appended figures, in which.

DETAILED DESCRIPTION

Figure 1:
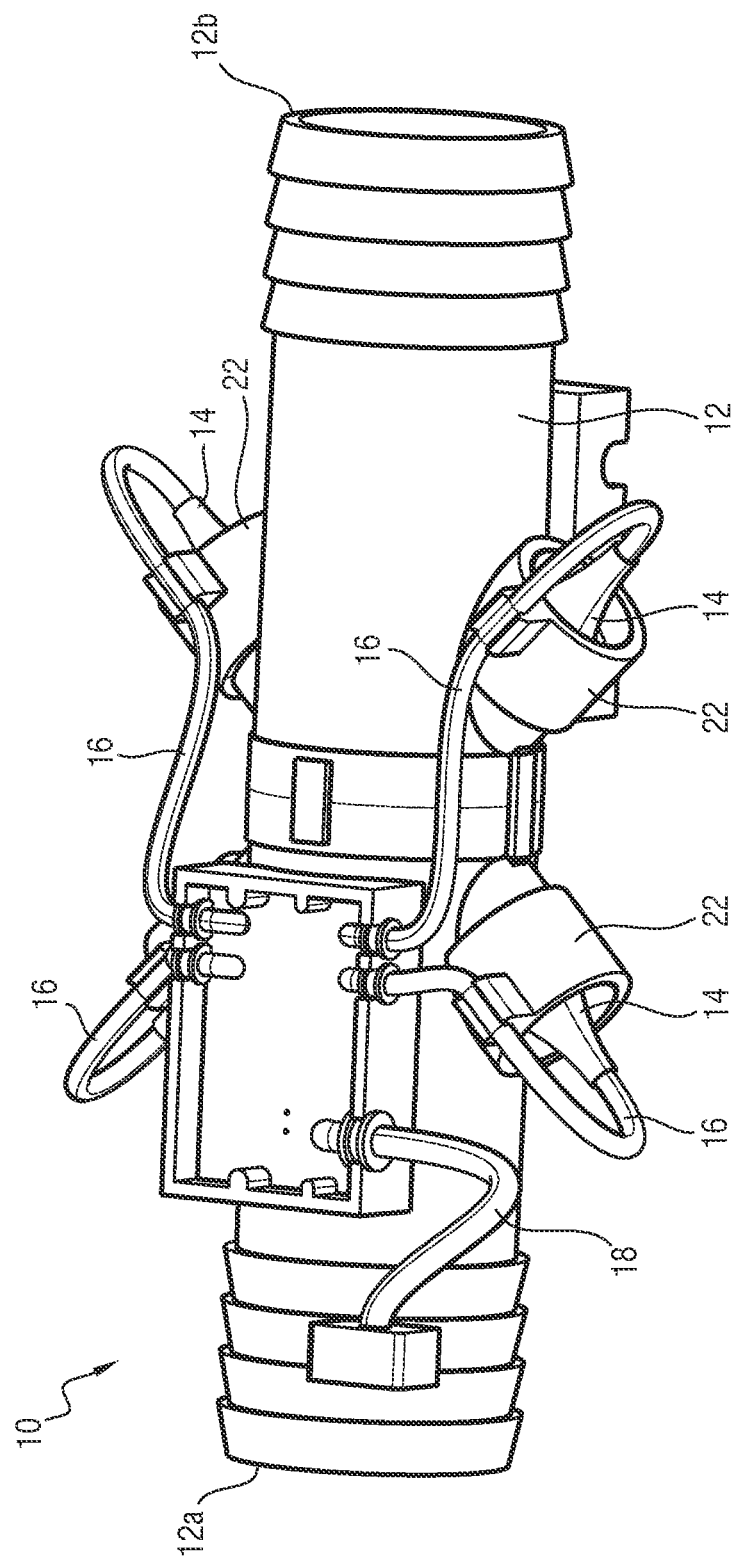
FIG. 1 is a perspective view of a driving device according to a first example embodiment of the disclosure.

FIG. 1 shows an exhaust gas driving device 10, in particular intended to equip an exhaust gas recirculation line for a heat engine, for example in a vehicle.

The driving device 10 includes a tubular exhaust gas circulation pipe 12. The tubular pipe 12 extends in a longitudinal direction defined by a longitudinal axis X, between an upstream end 12a and a downstream end 12b.

The tubular pipe 12 has, at each of its ends 12a, 12b, engagement shapes allowing its connection to pipes of the recirculation line.

Advantageously, the tubular pipe 12 is made from plastic.

The driving device 10 includes at least two flow rate measuring members 14, preferably four flow rate measuring members 14, arranged to measure a flow rate of exhaust gas circulating in the tubular pipe 12.

The driving device 10 includes power supply elements 16. More particularly, each measuring member 14 is powered by a respective power supply element 16. These power supply elements 16 are, for example, connected to a general power supply input element 18, which in turn is intended to be connected to an electricity source.

Advantageously, the flow rate measuring members 14 include at least one ultrasonic transmitter 14a and at least one ultrasonic receiver 14b associated with the ultrasonic transmitter 14a.

More particularly, the flow rate measuring members 14 include two ultrasonic transmitters 14a and two ultrasonic receivers 14b, each associated with a respective one of the ultrasonic transmitters 14a. The transmitters 14a and the receivers 14b therefore form pairs. The transmitter 14a and the receiver 14b of each pair are aligned facing one another, along an axis specific to this pair.

It will preferably be noted that each measuring member 14 is formed by a transducer able to serve as transmitter or receiver.

The transmitter 14a and the receiver 14b of each pair are generally arranged facing one another, on either side of the tubular pipe 12. Thus, the exhaust gases circulate between this transmitter 14a and this receiver 14b. The transmitter 14a emits ultrasounds, which are received by the receiver 14b. The duration between the transmission and the reception depends on the flow of exhaust gas circulating between the transmitter 14a and the receiver 14b. It is thus possible to determine the flow of exhaust gas as a function of this measured duration, in a manner known in itself.

According to the disclosure, the driving device 10 includes at least one monobloc support 20 made from elastomer, housed in the circulation pipe 12, each monobloc support 20 bearing at least two of the flow rate measuring members 14.

The monobloc support 20 is hollow, thus bearing a central opening allowing the exhaust gas to pass through it.

The monobloc support 20 is preferably made from elastomer, this material being capable of damping at least part of the vibrations experienced by the circulation pipe 12. Thus, the monobloc support 20 makes it possible to mechanically uncouple the circulation pipe 12 from the measuring members 14 that the support bears.

Advantageously, each monobloc support 20 made from elastomer is overmolded on the circulation pipe 12, inside this circulation pipe 12.

Different embodiments are shown in the figures. In these figures, similar elements are designated using identical references.

Figure 2:
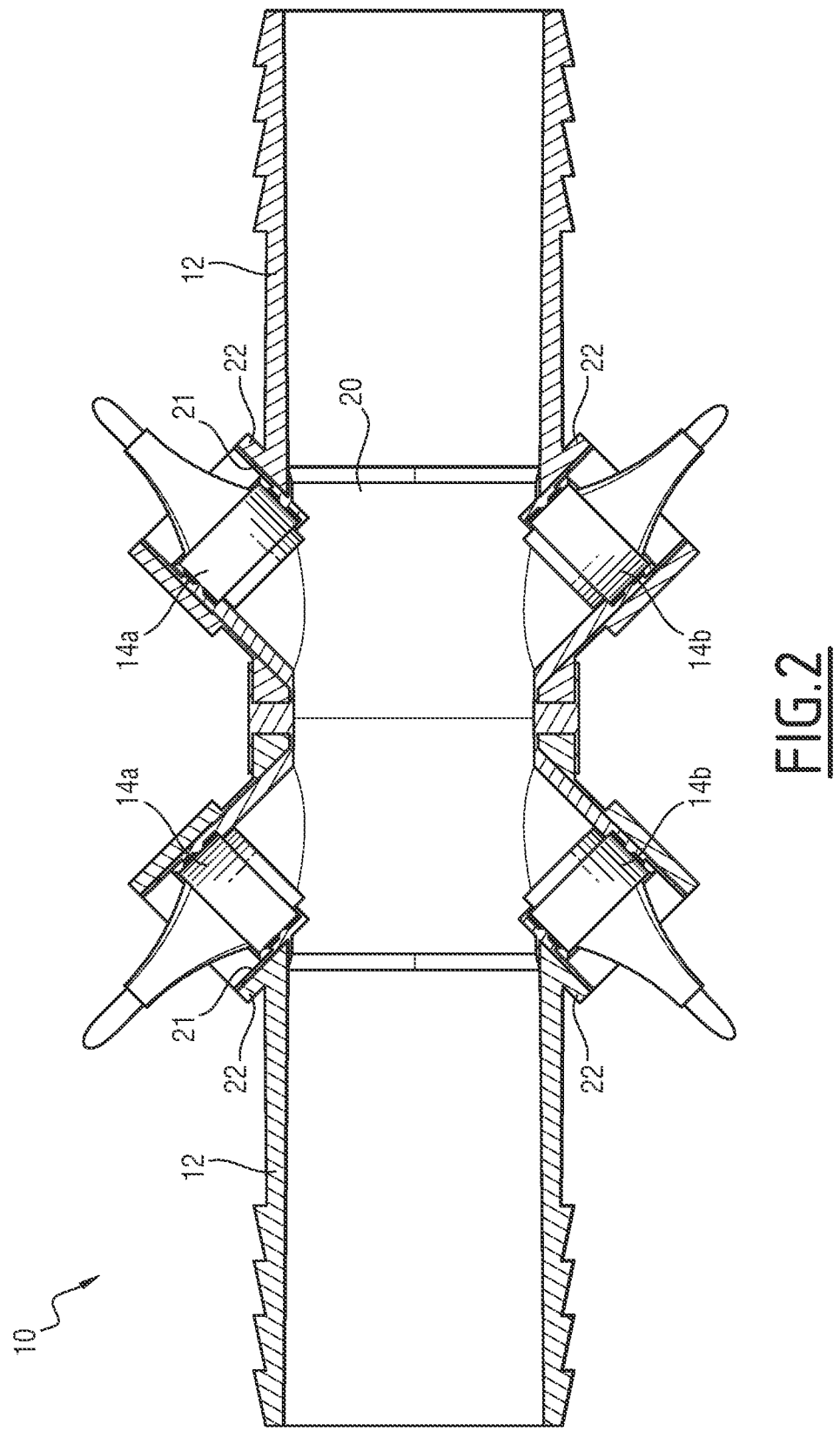
FIG. 2 is an axial sectional view of the driving device of FIG. 1.

A first embodiment is illustrated in FIGS. 1 and 2.

According to this first embodiment, the driving device 10 includes a monobloc support 20 bearing the transmitter 14a and the receiver 14b of a same transmitter/receiver pair, in order to optimally uncouple this transmitter 14a from this receiver 14b.

For example, the driving device 10 includes a single monobloc support 20, bearing all four measuring members 14.

Advantageously, the pipe 12 is made in two parts, connected to one another only by the monobloc support 20, without direct contact between these parts. These two parts are preferably coaxial, arranged one in the extension of the other. Thus, there is no possibility of transmission of the ultrasounds through the material of the pipe 12 between the transmitter 14a of a transmitter/receiver pair, borne by one of the parts of the pipe 12, and the receiver 14b of this same transmitter/receiver pair borne by the other part of the pipe 12.

Furthermore, in this first embodiment, the pipe 12 includes branches 22 forming sleeves for housing flow rate measuring members 14. Each flow rate measuring member 14 is then housed in a respective one of the sleeves 22. In this case, the monobloc elastomer support 20 includes, for each sleeve 22, a part 21 extending in this sleeve 22 such that, inside this sleeve 22, the sleeve 22 surrounds the part 21 of the monobloc support 20, which surrounds the corresponding measuring member 14. In other words, the part 21 of the monobloc support 20 is inserted radially between the measuring member 14 and the sleeve 22, in order to ensure the mechanical uncoupling thereof.

However, the sleeves 22 allow good geometric holding of the measuring members 14, each transmitter 14a thus staying correctly aligned with the corresponding receiver 14b.

Figure 3:
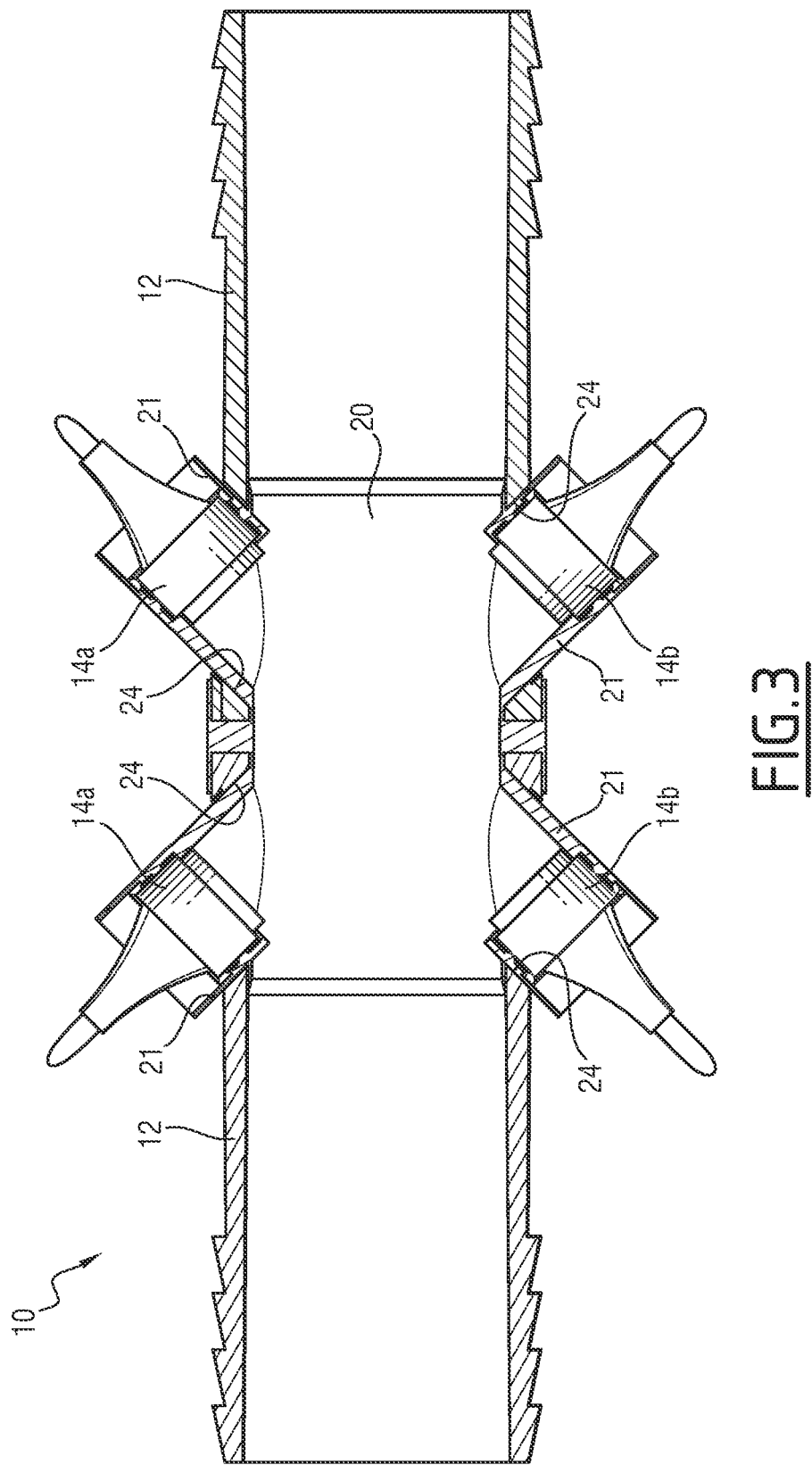
FIG. 3 is an axial sectional view of a driving device according to a second example embodiment of the disclosure.

A second embodiment is shown in FIG. 3. In this figure, the elements similar to those of the two preceding figures are designated using identical references.

According to this second embodiment, like in the first embodiment, the driving device 10 includes a single monobloc support 20 bearing the transmitter 14a and the receiver 14b of a same transmitter/receiver pair, in order to optimally uncouple this transmitter 14a from this receiver 14b. For example, the driving device 10 includes a single monobloc support 20, bearing all four measuring members 14.

Advantageously, the pipe 12 is made in two parts, connected to one another only by the monobloc support 20, without direct contact between these parts. Thus, there is no possibility of transmission of the ultrasounds through the material of the pipe 12 between the transmitter 14a of a transmitter/receiver pair, borne by one of the parts of the pipe 12, and the receiver 14b of this same transmitter/receiver pair borne by the other part of the pipe 12.

Conversely, in this second embodiment, the pipe 12 does not include sleeves for housing flow rate measuring members 14, but includes lateral openings 24 through which the measuring members 14 pass. More particularly, each measuring member 14 passes through a respective one of the lateral openings 24.

More particularly, the measuring members 14 are borne by the parts 21 of the monobloc support 20, each part 21 extending through a respective one of the lateral openings 24.

In this embodiment, the measuring members 14 are better still mechanically uncoupled from the pipe 12, since they are no longer even surrounded by part of this pipe 12.

Figure 4:
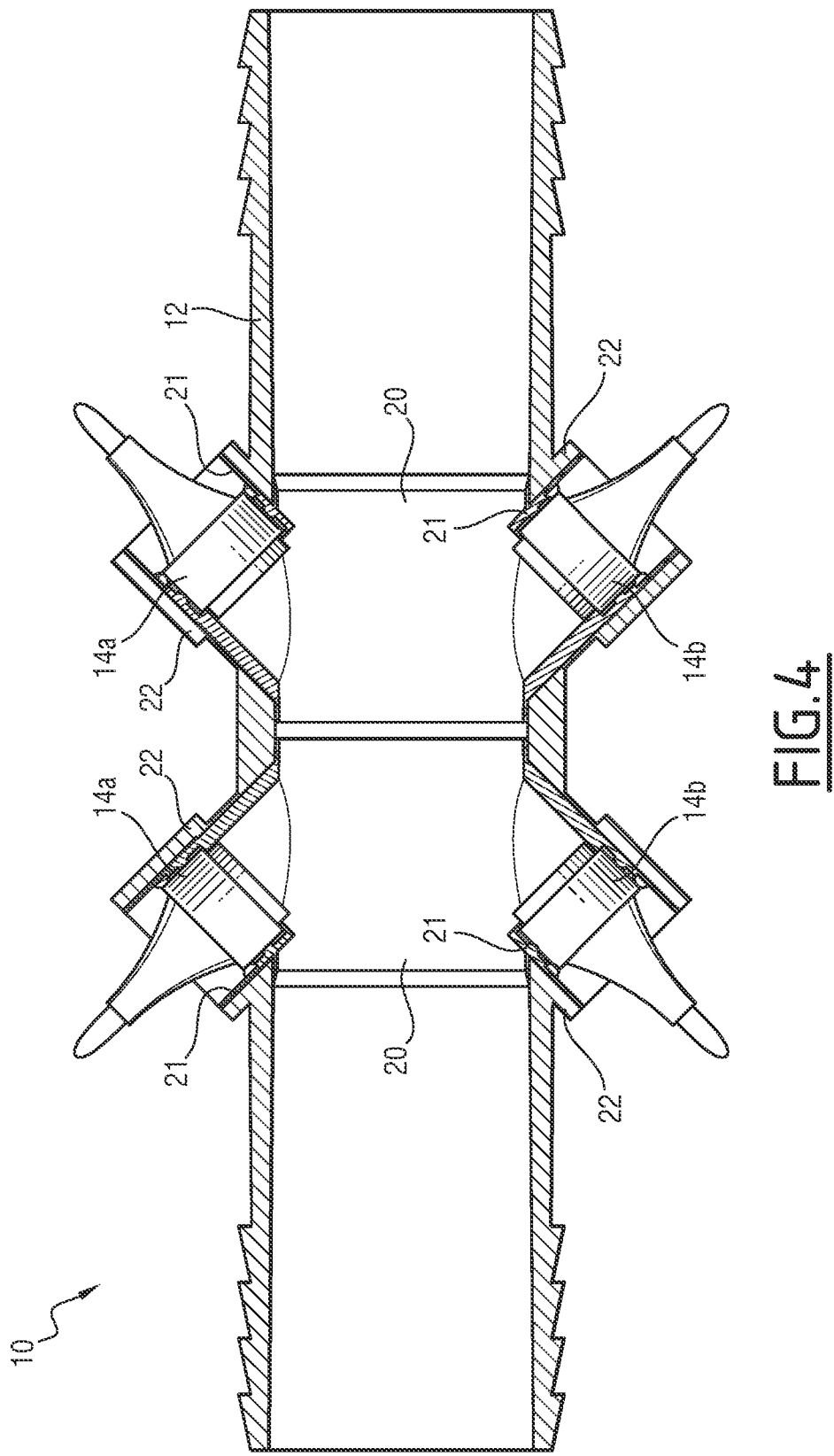
FIG. 4 is an axial sectional view of a driving device according to a third example embodiment of the disclosure.

A third embodiment is shown in FIG. 4. In this figure, the elements similar to those of the two preceding figures are designated using identical references.

According to this third embodiment, the driving device 10 includes two monobloc supports 20 made from elastomer, each bearing two respective measuring members 14.

For example, each support 20 bears one of the ultrasonic transmitters 14a and one of the ultrasonic receivers 14b, such that the transmitter 14a and the receiver 14b of each transmitter/receiver pair is borne by a different support.

In this third embodiment, the pipe 12 is monobloc.

In this third embodiment, like in the first one, the pipe 12 includes sleeves 22 each housing a part 21 of the support 20, this part 21 housing a respective one of the measuring members 14.

Figure 5:
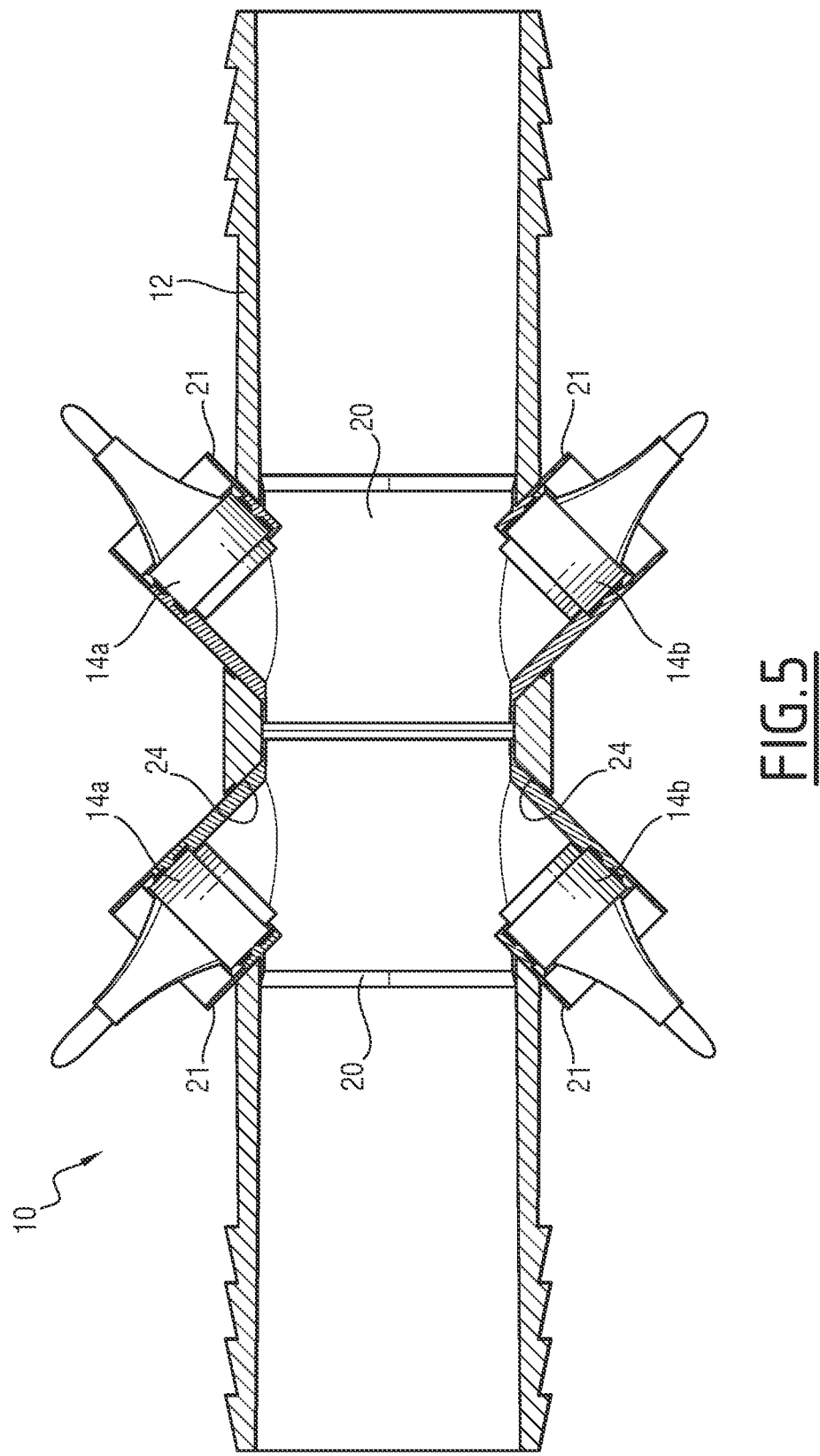
FIG. 5 is an axial sectional view of a driving device according to a fourth example embodiment of the disclosure.

A fourth embodiment is shown in FIG. 5. In this figure, the elements similar to those of the two preceding figures are designated using identical references.

According to this fourth embodiment, the driving device 10 includes, like in the third embodiment, two monobloc supports 20 made from elastomer, each bearing two respective measuring members 14.

For example, each support 20 bears one of the ultrasonic transmitters 14a and one of the ultrasonic receivers 14b, such that the transmitter 14a and the receiver 14b of each transmitter/receiver pair is borne by a different support.

In this fourth embodiment, the pipe 12 is monobloc.

In this fourth embodiment, like in the second one, the pipe 12 includes lateral openings 24 through which parts 21 of the support 20 pass, each part 21 housing a respective one of the measuring members 14.

It will be noted that the disclosure is not limited to the embodiments previously described, but could take the form of various additional variants.

The invention claimed is:

1. A driving device for driving exhaust gas, including:
    a tubular circulation pipe for circulation of the exhaust gas;
    at least two flow rate measuring members arranged to measure an exhaust gas flow rate of the exhaust gas circulating in the tubular circulation pipe; and
    at least one monobloc support, housed in the tubular circulation pipe, and bearing at least two flow rate measuring members among said at least two flow rate measuring members, and wherein each monobloc support is made from an elastomer.

2. The driving device according to claim 1, wherein each monobloc support is overmolded on the tubular circulation pipe.

3. The driving device according to claim 1, wherein the at least two flow rate measuring members include at least one ultrasonic transmitter and at least one ultrasonic receiver associated with the at least one ultrasonic transmitter.

4. The driving device according to claim 1, wherein the at least one monobloc support comprises a single monobloc support bearing all of the flow rate measuring members.

5. The driving device according to claim 1, wherein the tubular circulation pipe is made in two parts, these two parts being connected to one another by the at least one monobloc support, without direct contact between these two parts.

6. The driving device according to claim 1, wherein the at least one monobloc support comprises two monobloc supports, each bearing two respective flow rate measuring members.

7. The driving device according to claim 1, wherein the tubular circulation pipe bears two branches forming sleeves for housing the at least two flow rate measuring members, each flow rate measuring member being housed in a respective one of the sleeves, the at least one monobloc support including, for each flow rate measuring member that the at least one monobloc support bears, a part bearing this flow rate measuring member while extending in a corresponding sleeve.

8. The driving device according claim 1, wherein the tubular circulation pipe includes lateral openings, each flow rate measuring member being housed through a respective one of these lateral openings, the at least one monobloc support including, for each flow rate measuring member that the at least one monobloc support bears, a part bearing this flow rate measuring member while extending through a corresponding lateral opening.

9. The driving device according to claim 1, wherein the tubular circulation pipe is made from plastic.

10. An exhaust gas recirculation line, including:
    a driving device including a tubular circulation pipe for circulation of exhaust gas, and at least two flow rate measuring members arranged to measure an exhaust gas flow rate of the exhaust gas circulating in the tubular circulation pipe, the driving device including at least one monobloc support, housed in the tubular circulation pipe, and bearing at least two flow rate measuring members among said at least two flow rate measuring members, and wherein each monobloc support is made from an elastomer.

11. A vehicle, including:
    an exhaust gas recirculation line; and
    a driving device including a tubular circulation pipe for circulation of exhaust gas, and at least two flow rate measuring members arranged to measure an exhaust gas flow rate of the exhaust gas circulating in the tubular circulation pipe, the driving device including at least one monobloc support, housed in the tubular circulation pipe, and bearing at least two flow rate measuring members among said at least two flow rate measuring members, and wherein each monobloc support is made from an elastomer.

* * * * *